United States Patent
Suzuki et al.

(10) Patent No.: US 8,170,846 B2
(45) Date of Patent: May 1, 2012

(54) COMPUTATION METHOD OF MECHANICAL MATERIAL CONSTANT OF COMPOSITE MATERIAL AND VOLUME FRACTION OF MATERIAL COMPONENT IN COMPOSITE MATERIAL, AND RECORDING MEDIUM

(75) Inventors: Nobuo Suzuki, Kanagawa (JP); Kazuyuki Kabe, Kanagawa (JP); Seiichi Nomura, Arlington, TX (US)

(73) Assignee: The Yokohama Rubber Co., Ltd., Tokyo (JP)

(*) Notice: Subject to any disclaimer, the term of this patent is extended or adjusted under 35 U.S.C. 154(b) by 498 days.

(21) Appl. No.: 12/423,196

(22) Filed: Apr. 14, 2009

(65) Prior Publication Data
US 2010/0262407 A1    Oct. 14, 2010

(51) Int. Cl.
*G06F 17/50* (2006.01)
(52) U.S. Cl. .............. 703/2; 703/5; 703/7; 703/14
(58) Field of Classification Search .............. 703/2, 5, 703/7, 14
See application file for complete search history.

(56) References Cited

U.S. PATENT DOCUMENTS

| 7,557,367 | B2* | 7/2009 | Rogers et al. | 257/9 |
| 2009/0294803 | A1* | 12/2009 | Nuzzo et al. | 257/213 |
| 2010/0025263 | A1* | 2/2010 | White et al. | 205/777.5 |
| 2010/0317132 | A1* | 12/2010 | Rogers et al. | 438/27 |

FOREIGN PATENT DOCUMENTS

| JP | 2003-347301 A | 12/2003 |
| JP | 2007-122242 A | 5/2007 |
| JP | 2007-265382 A | 10/2007 |

* cited by examiner

*Primary Examiner* — Thai Phan
(74) *Attorney, Agent, or Firm* — Global IP Counselors, LLP

(57) ABSTRACT

In a method of computing the overall material constant of a composite material, a virtual composite material is defined as the one that a first material component is dispersed in a form of inner spherical particles in a matrix phase and each of the inner spherical particles is enveloped by the second material component, in a form of outer shell layers, as a coating layer. Based on this, a nonlinear equation is prepared, which has the material constant of the virtual composite material as an unknown. Next, the material constant of the virtual composite material is computed by solving the equation. In the equation, the material constant in each of the surrounding areas of the outer shell layers coating the inner spherical particles is defined as the overall material constant of the virtual composite material to be computed. The volume fractions of the material components in the composite material are computed using the equation.

18 Claims, 6 Drawing Sheets

COMPUTATION METHOD OF MECHANICAL MATERIAL CONSTANT OF COMPOSITE MATERIAL AND VOLUME FRACTION OF MATERIAL COMPONENT IN COMPOSITE MATERIAL, AND RECORDING MEDIUM

BACKGROUND OF THE INVENTION

1. Field of the Invention

The present invention relates to a method of computing the overall mechanical material constant of a composite material which includes the first and the second material components having known mechanical material constants embedded in a matrix phase having a known mechanical material constant. Additionally, the present invention relates to a method of computing the volume fraction of the first material component or the second material component in the composite material which includes the first and the second material components having known mechanical material constants in a matrix phase having a known mechanical material constant. Furthermore, the present invention relates to a recording medium storing a program for causing a computer to execute the aforementioned methods.

2. Description of the Related Arts

Conventionally, a variety of attempts have been actively employed for accurately estimating the mechanical characteristic of a composite material in which predetermined material components are dispersed in a matrix phase. The estimation intends to efficiently identify a variety of factors using a computer for tailoring the composite material to have a desired characteristic, instead of finding them by an actual experiment. For example, the factors may include identification of the mechanical characteristics of the material components in the composite material and the volume fractions of the material components. As a result, it is possible to design a mixture of components with desired characteristics in an early stage.

Under the circumstance, JP-A-2007-122242 discloses a method for analyzing a macro-structure which consists of multiple minute elements in which a micro-structure that has a three-dimensionally heterogeneous deformation characteristic is repeated periodically in one direction. In the publication, the homogenized elastic modulus is computed by identifying a unit cell (i.e., a periodic unit in the macro-structure) and assuming the unit cell to have a homogeneous material characteristic. Subsequently, the macro-structure is modeled by assuming that it has a homogenized elastic characteristic. Then, a macro-scale analysis is executed for computing the deformation of the macro-structure at a given position in the direction of the periodical arrangement. Furthermore, a local analysis is executed. In the local analysis, the obtained deformation of the macro-structure at a given position in the direction of the periodical arrangement is applied to the minute elements forming the unit cell arranged in the position, and local responses are obtained from the minute elements.

According to the publication, the structural analysis method is capable of reducing a period of time required for the structural computation of the macro-structure which is heterogeneous on its cross-section.

However, the structural analysis method is executed using a finite element model formed with minute elements. Accordingly, the method has a drawback in that a long period of time is necessary for generation of a model and computation and it cannot be thereby a useful means for time-critical initial design and development in the early stage.

On the other hand, a classical analytical model, using a spring and a dash pot, has also been conventionally used for computing the mechanical characteristic of composite materials. The model spends a short period of time for computation, and is efficient in this regard. However, the micro-state of a composite material cannot be taken into account in the model. Therefore, the model also has a drawback in that a computational result does not include much information and thereby the computational result is not accurate.

SUMMARY OF THE INVENTION

In order to overcome the drawback, it is an object of the present invention to provide a method of computing the overall material constant of a composite material and a method of computing the volume fraction of a material component in the composite material, for more efficient computation in a shorter period of time than the conventional computational method using a finite element model. Furthermore, it is an object of the present invention to provide a recording medium storing a program for causing a computer to execute the methods.

The aforementioned object is achieved by the following method of computing the overall mechanical material constant of composite material which includes a first composite material and a second composite material in a material phase. Note the mechanical material constants of the first and second composite materials and the matrix phase are known.

In short, the method includes the following steps of:

(A) preparing a nonlinear equation having the overall material constant of a virtual composite material as an unknown by defining, as a composite material, the virtual composite material in which the first material component is dispersed in a form of inner spherical particles in the matrix phase at a known volume fraction and the second material component is in a form of outer shell layers, each of which coats a periphery of each of the inner spherical particles as a coating layer of the predetermined thickness; and (B) computing the overall material constant of the virtual composite material as the overall material constant of the composite material by solving the prepared nonlinear equation, and (C) in this case, the nonlinear equation is a recursive nonlinear equation by computing the material constant in each of the surrounding areas of the outer shell layers coating the inner spherical particles in the virtual composite material as the overall material constant of the virtual composite material to be computed.

In the method, it is preferable to prepare the nonlinear equation by determining the displacement in the virtual composite material under a condition that the displacement and the surface traction are continuous across each of the boundaries between the inner spherical particles and the coating layers and a condition that the displacement and the surface traction are continuous across each of the boundaries between the outer shell layers and the matrix phase.

In addition, when the material constant of the matrix phase, the material constant of the first material component, the material constant of the second material component, the volume fraction of the first material component, the volume fraction of the second material component and the overall material constant of the virtual composite material are represented as $C^A$, $C^B$, $C^C$, $v_B$, $v_C$, and $C^*$, respectively, it is preferable to represent the nonlinear equation using the following equation.

Each of "$A^B(C^B, C^C, C^*)$" and "$A^C(C^B, C^C, C^*)$" in the following equation is obtained by defining the material constant of the outer shell layers coating the inner spherical particles in the virtual composite material as the material constant $C^C$ of the second material component and by defining the material constant in each of the surrounding areas of the outer shell layers coating the inner spherical particles as the overall material constant of the virtual composite material to be computed, and each of "$A^B(C^B, C^C, C^*)$" and "$A^C(C^B, C^C, C^*)$" is a proportional constant determined by a nonlinear expression having the material constant C* as an unknown.

$$C^* = C^A + v_B \cdot (C^B - C^A) \cdot A^B(C^B, C^C, C^*) + v_C \cdot (C^C - C^A) \cdot A^C(C^B, C^C, C^*)$$

Furthermore, the aforementioned object is achieved by the following method of computing the volume fraction of a first material component or a second material component in a composite material. Here, the composite material includes the first and second material components in a matrix phase, and the mechanical material constants of the first and second material components and the matrix phase are known.

The method includes the steps of:

(D) determining the overall material constant of the composite material based on an experimental result;

(E) preparing a nonlinear equation having the volume fraction of the first material component or the second material component as an unknown by defining, as the composite material, a virtual composite material in which the first material component is dispersed in a form of inner spherical particles in the matrix phase and the second material component is in a form of outer shell layers, each of which coats a periphery of each of the inner spherical particles as a coating layer of the predetermined thickness; and (F) computing the volume fraction of the first material component or the second material component by solving the prepared nonlinear equation.

(G) In this case, the nonlinear equation is a recursive nonlinear equation obtained by defining, as the predetermined overall material constant of the composite material, the material constant in each of the surrounding areas of the outer shell layers coating the inner spherical particles in the virtual composite material.

In the method, it is preferable to prepare the nonlinear equation by determining the displacement in the virtual composite material under a condition that the surface traction and the displacement are continuous across each of the boundaries between the inner spherical particles and the coating layers and a condition that the surface traction and the displacement are continuous across each of the boundaries between the outer shell layers and the matrix phase.

When the material constant of the matrix phase, the material constant of the first material component, the material constant of the second material component, the volume fraction of the first material component, the volume fraction of the second material component and the overall material constant of the virtual composite material are represented as $C^A$, $C^B$, $C^C$, $v_B$, $v_C$, and $C^*$, respectively, it is preferable to represent the nonlinear equation using the following equation.

Each of "$A^B(C^B, C^C, C^*)$" and "$A^C(C^B, C^C, C^*)$" in the following equation is obtained by defining the material constant of the outer shell layers coating the inner spherical particles in the virtual composite material as the material constant $C^C$ of the second material component and by defining the material constant in each of the surrounding areas of the outer shell layers coating the inner spherical particles as the predetermined overall material constant of the composite material, and each of "$A^B(C^B, C^C, C^*)$" and "$A^C(C^B, C^C, C^*)$" is a proportional constant determined by a nonlinear expression having the material constant C* as an unknown.

$$C^* = C^A + v_B \cdot (C^B - C^A) \cdot A^B(C^B, C^C, C^*) + v_C \cdot (C^C - C^A) \cdot A^C(C^B, C^C, C^*)$$

Furthermore, the aforementioned object is achieved by a recording medium storing a computer-executable program for computing the overall mechanical material constant of a composite material using the aforementioned computation method. Here, the composite material includes a first material component and a second material component in a matrix phase, and the mechanical material constants of the first and second material components and the matrix phase are known.

Similarly, the aforementioned object is achieved by a recording medium storing a computer-executable program for computing the volume fraction of the first material component or the second material component in a composite material with the aforementioned computation method. Here, the composite material includes the first and the second material components in a matrix phase, and the mechanical material constants of the first and the second material components and the matrix phase are known.

The recursive nonlinear equation, common to the aforementioned computational methods, is based on Equation (6) to be described. Specifically, the proportional constant A in Equation (6), used for the recursive nonlinear equation, is computed when the strain field of the virtual composite material is computed using the Navier equation. In this case, the material constant in each of the surrounding areas of the spherical particles in the virtual composite material is defined as the overall material constant of the virtual composite material. In other words, the self-consistency approximation method is herein used.

According to the present invention, the virtual composite material, where the predetermined material components are dispersed in a form of spherical particles in the matrix phase, is defined as the composite material. Furthermore, the nonlinear equation to be used is an analytic recursive nonlinear equation which is obtained by defining the material constant in each of the surrounding areas of the outer shell layers coating the inner spherical particles in the virtual composite material as the overall material constant of the virtual composite material to be computed. Therefore, the aforementioned methods are capable of efficiently computing the overall material constant of the composite material and the volume fractions of the material components in the composite material in a short period of time.

DETAILED DESCRIPTION OF THE EMBODIMENTS

Following is a detailed explanation of a method of computing the overall material constant of a composite material according to the present invention and a method of computing the volume fraction of a material component in a composite material according to the present invention. The explanation is based on an embodiment illustrated in the attached drawings.

Figure 1:
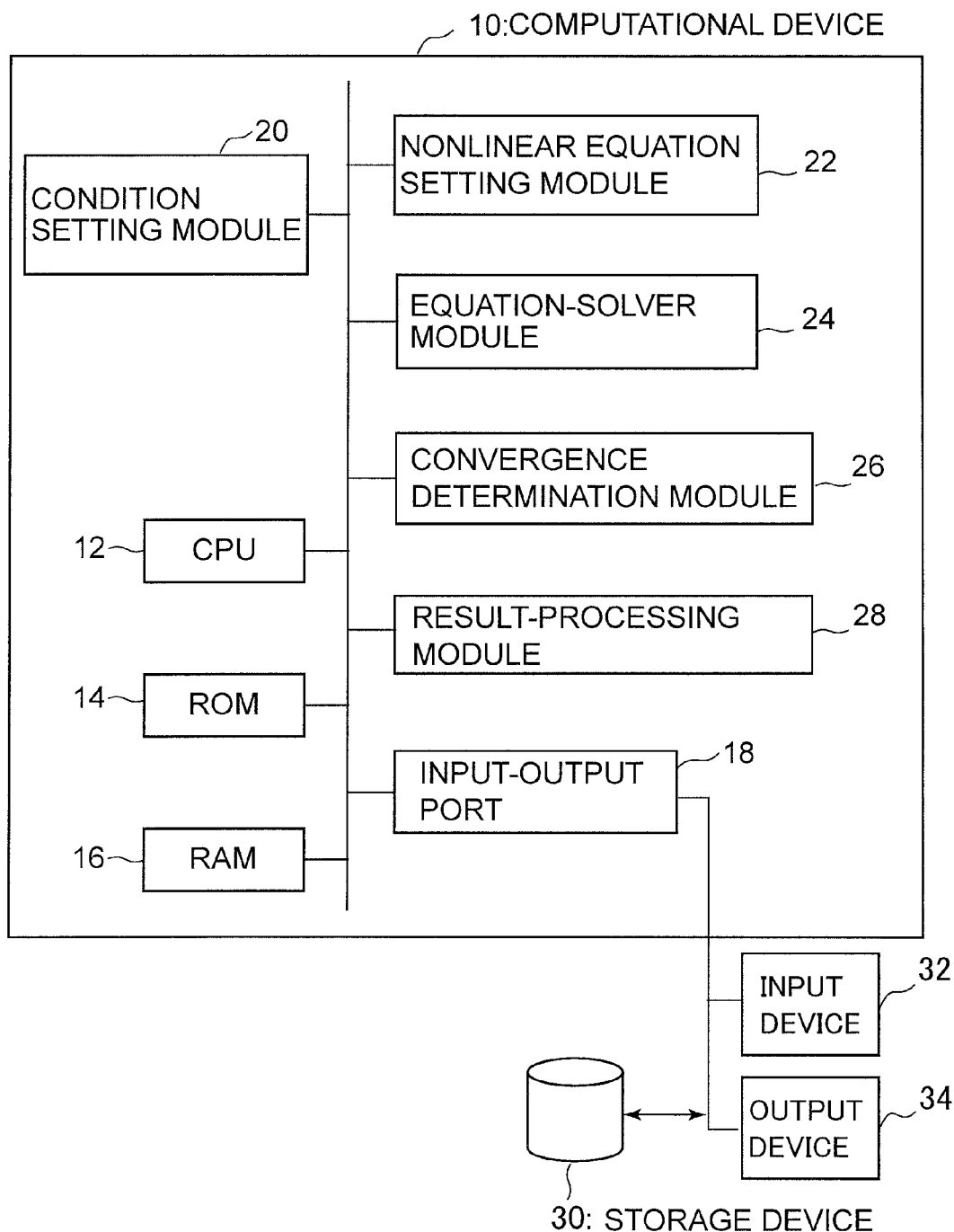
FIG. 1 is a schematic diagram for illustrating an example of a computational device for executing both of the methods of computing the overall material constant of a composite material according to the present invention and computing the volume fraction of a material component in the composite material according to the present invention.

FIG. 1 illustrates a computational device 10 for executing a method for computing the overall material constant of a composite material and a method of computing the volume fraction of a material component in the composite material.

The computational device 10 is configured with a computer including CPU 12, ROM 14, RAM 16 and an input-output port 18. The computational device 10 is provided with a condition setting module 20, a nonlinear equation setting module 22, an equation-solver module 24, a convergence determination module 26 and a result-processing module 28 invoked when a program stored in ROM 14 starts up. In other words, the modules are invoked when the software is started. For example, some of the modules of the computational device 10 use a computer algebra system.

The computational device 10 is connected to a storage device 30, an input device 32 (e.g., a mouse and a keyboard), an output device 34 (e.g., a printer and a monitor) through the input-output port 18.

The computational device 10 selectively executes either one of:

(1) the first processing of computing the overall mechanical material constant of the composite material which includes the first and the second material components having known mechanical material constants in a matrix phase having a known mechanical material constant; and (2) the second processing of computing the volume fraction of the first material component or the second material component in a composite material which includes the first and second material components having known mechanical material constants in a matrix phase having a known mechanical material constant. Note the term "mechanical material constant" is hereinafter simply referred to as "material constant."

The condition setting module 20 determines which of the first processing or the second processing will be executed. Simultaneously, the module 20 prepares information necessary for the first processing or the second processing and sets a variety of values based on the information.

In the first processing, the module 20 sets values of the material constant of the matrix phase, the material constant(s) of a single or multiple kinds of material components and the volume fraction(s) of the single or multiple kinds of material components. For example, the material constants herein include a pair of the Lamé constants $\lambda$, $\mu$, or a pair of the bulk modulus K and either one of the Lamé constants $\lambda$ or $\mu$. The bulk modulus K is associated with the Lamé constants $\lambda$, $\mu$, as "$K=\lambda+\frac{2}{3}\mu$." For example, it is accordingly possible to express the material constant with the bulk modulus K and the Lamé constant $\mu$.

In the second processing, on the other hand, the module 20 sets a value of the overall material constant of the composite material obtained by an experiment, a value(s) of the material constant(s) of a single or multiple kinds of material components and a value(s) of the volume fraction(s) of the single or multiple kinds of material components.

The values are set by an instruction inputted by an operator through the input device 32. Alternatively, the values are set by calling up preliminarily stored information from the storage device 30.

The nonlinear equation setting module 22 prepares a nonlinear equation, depending on the first processing or the second processing, with the value of the material constant and the value of the volume fraction which have been set by the module 20. In both of the first processing and the second processing, when the composite material is assumed to include multiple kinds of material components in a matrix phase, the module 22 calls up a recursive nonlinear equation for computing the overall material constant of the composite material (i.e., Equation (6) to be described), and gives appropriate values to the coefficients of the equation based on the material constants and the volume fraction. Consequently, an equation, composed of unknowns to be computed, is herein prepared.

In the first processing, the equation-solver module 24 recursively computes the overall material constant of the composite material which is close to approximately-convergent, based on its initial approximation value using the prepared recursive nonlinear equation which employs the Newton-Raphson method, when a value is given to the overall material constant of the composite material to be computed. In other words, the module 24 firstly sets the initial value (where n=1) of the overall material constant of the composite material. Then, the module 24 recursively computes a value of the overall material constant of the composite material (where n=2), that is, a more closely convergent value, based on the recurrence formula using the initial value. The more closely convergent value is transmitted to the convergence determination module 26 which will be described later, to be used for the convergence determination. When the module 26 determines that the value is not convergent, the module 24 repeats the computation of the overall material constant of the composite material (where n=3), that is, a further closely convergent value, based on the aforementioned recurrence formula using the previously computed value of the overall material constant. Thus, the module 24 repeatedly executes processing for recursively computing the value of the overall material constant of the composite material until the module 26 determines that convergence of the value is reached.

In the second processing, on the other hand, the equation-solver module 24 defines the following function f(x) (note "x" is the volume fraction of a predetermined material component to be computed). Then, the module 24 computes a product $f(x_1) \cdot f(x_2)$ by multiplying $f(x_1)$ (where $x=x_1$ (maximum)) and $f(x_2)$ (where $x=x_2$ (minimum)). The module 24 transmits the product to the convergence determination module 28.

Function f(x)=(the overall material constant of the composite material obtained by an experiment)−(the overall material constant of the composite material having the volume fraction x to be computed from the recursive nonlinear equation (6)).

The product $f(x_1) \cdot f(x_2)$ is repeatedly computed until convergence is reached while the maximum value ($x=x_1$) and the minimum value ($x=x_2$) are changed.

The convergence determination module 26 determines if the overall material constant of the composite material computed by the equation-solver module 24 is convergent.

In the first processing, when the absolute value of the difference between the value of the overall material constant of the composite material computed at the number of repetition (n+1) and the value of the overall material constant of the composite material computed at the number of repetition (n) is less than a preset threshold, the convergence determination module 26 determines that the value of the overall material constant of the composite material at the number of repetition (n+1) is convergent. Otherwise, the module 26 determines that the overall material constant of the composite material at the number of repetition (n+1) is not convergent. Consequently, the module 24 is instructed to execute computation with the obtained value at the number of repetition (n+1). As described above, the recursive nonlinear equation with explicit numeric values given to the coefficients. Accordingly, the derivative of such a function is also easily computed. Therefore, the module 26 is capable of computing the converged value using the known Newton-Raphson method.

In the second processing, on the other hand, the sign of $f(x_1) \cdot f(x_2)$ is checked. Then, as described below, the maximum value and the minimum value of x are set again using the bisection method.

The result-processing module 28 computes the overall Young modulus and the overall shear modulus of the composite material or obtains the volume fraction of a material component based on the value determined as a converged solution by the module 26.

The output device 34 prints out a variety of information obtained by the module 28. Alternatively, the output device 34 displays the variety of information on a screen.

The storage device 30 preliminarily stores a database having recorded and held preliminarily-set overall material constant of the composite material and preliminarily-set material constant(s) of a single or multiple kinds of material components included in the composite material.

The aforementioned processing is achieved by analytically computing the overall material constant of the composite material using the following recursive nonlinear equation. The following is a detailed explanation of the recursive nonlinear equation.

Figure 2A:
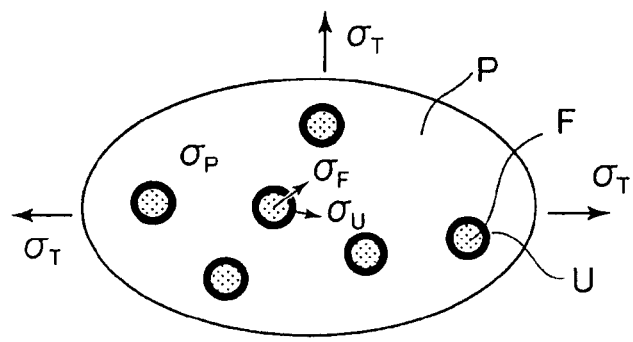
FIGS. 2A, 2B and 2C are diagrams for illustrating the stress and strain in a composite material.
Figure 2B:
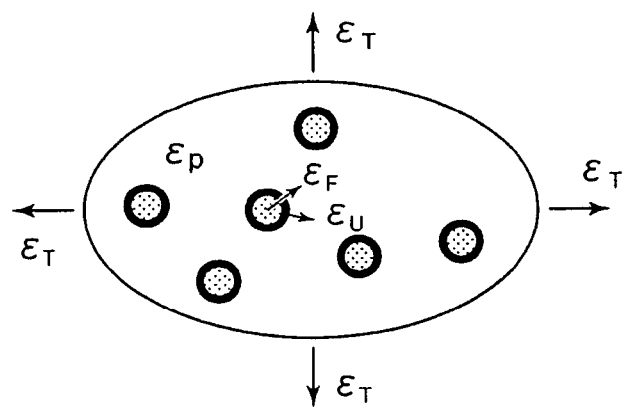
Figure 2C:
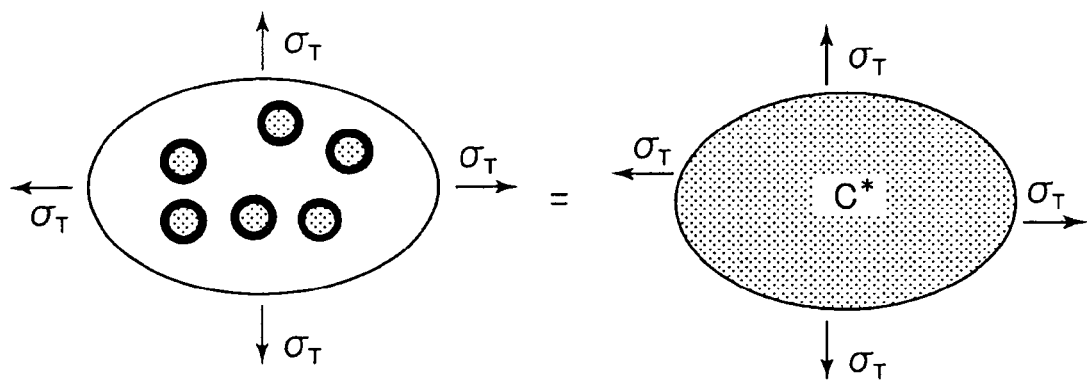

FIGS. 2A to 2C are diagrams for illustrating the composite material.

"Stress," "strain" and "material constant," hereinafter explained, are a second rank tensor, a second rank tensor and a fourth rank tensor, respectively. However, they will be denoted as a scalar for easy understanding.

As illustrated in FIG. 2A, the composite material is composed of Epoxy resin P (hereinafter referred to as Epoxy), Filler F and Urethane material U. Epoxy P is a matrix phase, and Filler F and Urethane U are included in Epoxy P. In this case, Urethane U envelops Filler F as a coating layer of the constant thickness. Here, $v_P$, $v_F$ and $v_U$ are the volume fractions of Epoxy P, Filler F and Urethane U, respectively. The equation, "$v_P + v_F + v_U = 1$," is established.

As illustrated in FIG. 2A, in the composite material, the overall average stress $\sigma_T$ of the composite material is obtained by weighting addition of the stress $\sigma_F$ in Filler F, the stress $\sigma_U$ in Urethane U and the stress $\sigma_P$ in Epoxy P with the volume fractions thereof as weighting coefficients, respectively. As illustrated in FIG. 2B, on the other hand, the overall average strain $\epsilon_T$ of the composite material is obtained by weighting addition of the strain $\epsilon_F$ generated in Filler F, the strain $\epsilon_U$ generated in Urethane U and the strain $\epsilon_P$ generated in Epoxy P with the volume fractions thereof as weighting coefficients, respectively. The average stress $\sigma_T$ is expressed by the following Equation (1) whereas the average strain $\epsilon_T$ is expressed by the following Equation (2).

Equation (1):

$$\sigma_T = v_P \sigma_P + v_U \sigma_U + v_F \sigma_F \quad (1)$$

Equation (2):

$$\epsilon_T = v_P \epsilon_P + v_U \epsilon_U + v_F \epsilon_F \quad (2)$$

As illustrated in FIG. 2C, on the other hand, a material constant C* for defining the relation between the overall average stress $\sigma_T$ and the overall average strain $\epsilon_T$ of the composite material is represented by the following Equation (3). In short, the herein assumed virtual composite material is a homogeneous material and a material constant thereof is "C*."

Equation (3):

$$\sigma_T = C^* \epsilon_T \quad (3)$$

When the strain is herein focused, the relation between the strain $\epsilon_U$ generated in Urethane U and the strain $\epsilon_T$ generated of the composite material is represented by the following Equation (4). On the other hand, the relation between the strain $\epsilon_F$ generated in Filler F and the strain $\epsilon_T$ generated of the composite material is represented by the following Equation (5).

Equation (4):

$$\epsilon_U = A^U \epsilon_T \quad (4)$$

Equation (5):

$$\epsilon_F = A^F \epsilon_T \quad (5)$$

In Equation (4), the average strain $\epsilon_U$ generated in Urethane U is represented as a function of $\epsilon_T$. Equation (4) represents that $\epsilon_U$ is associated with $\epsilon_T$ by a proportional constant $A^U$. In Equation (5), the average strain $\epsilon_F$ generated in Filler F is represented as a function of $\epsilon_T$. Equation (5) represents that $\epsilon_F$ is associated with $\epsilon_T$ by a proportional constant $A^F$.

It is possible to compute the proportional constants $A^U$ and $A^F$ by first assuming, as a composite material, a virtual composite material, which is composed of inner spherical particles and outer shell layers, each inner spherical particle being made of Filler F and being dispersed in Epoxy P at a known volume fraction, and each outer shell layer enveloping one of the inner spherical particles as a coating layer made of Urethane U of the predetermined thickness, and next by defining the material constant in each of the surrounding areas of the outer shell layers as the overall material constant C* of the virtual composite material to be computed. In other words, it is possible to represent the proportional constants $A^U$ and $A^F$ using the material constant of Urethane U, the material constant of Filler F and the overall material constant C* of the homogeneous virtual composite material. When the material constant of Urethane U is denoted as $C^U$, the proportional constant $A^U$ is represented by the formula "$A^U = A^U(C^U, C^F, C^*)$" whereas the proportional constant $A^F$ is represented by the formula "$A^F = A^F(C^U, C^F, C^*)$." A method of computing the formulas "$A^U = A^U(C^U, C^F, C^*)$" and "$A^F = A^F(C^U, C^F, C^*)$" will be hereinafter explained. The formulas "$A^U = A^U(C^U, C^F, C^*)$" and "$A^F = A^F(C^U, C^F, C^*)$" are nonlinear expressions represented by complex expressions of "$C^U, C^F, C^*$." For example, $C^U$ herein represents the bulk modulus $K^U$ and the Lamé constant $\mu^U$ of Urethane U. $C^F$ herein represents the bulk modulus $K^F$ and the Lamé constant $\mu^F$ of Filler F. C* herein represents the bulk modulus K* and the Lamé constant $\mu^*$ of the virtual composite material. The following Equation (6) is derived by organizing Equations (1) to (4) using the proportional constants. In this case, $C^P$ is the material constant of Epoxy P.

Equation (6):

$$C^* = C^P + \upsilon_U(C^U - C^P)A^U + \upsilon_F(C^F - C^P)A^F \qquad (6)$$

Equation (6) is a formula for computing the material constant $C^*$ of the left-hand side of the equation. The expressions "$A^U(C^U, C^F, C^*)$" and "$A^F(C^U, C^F, C^*)$" on the right-hand side of the equation are nonlinear expressions with regard to $C^U$, $C^F$ and $C^*$. Accordingly, Equation (6) is a recursive nonlinear equation with regard to the material constant $C^*$.

Figure 3:
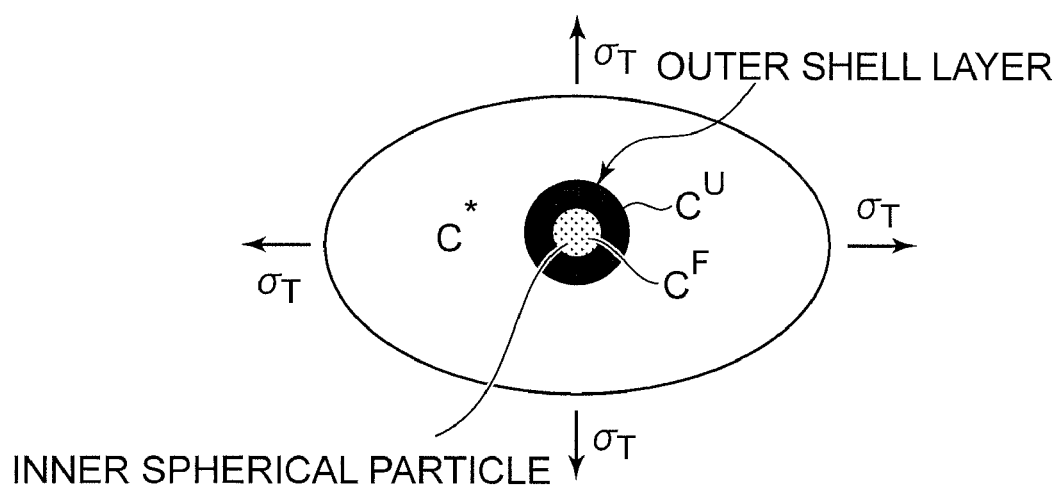
FIG. 3 is a diagram for illustrating a virtual composite material to be used for both of the methods of computing the overall material constant of the composite material according to the present invention and computing the volume fraction of a material component in the composite material according to the present invention.

As illustrated in FIG. 3, the proportional constants "$A^U(C^U, C^F, C^*)$" and "$A^F(C^U, C^F, C^*)$" are obtained by first assuming a model that outer shell layers which will be explained later are disposed and next by defining the material constant in each of the surrounding areas of the outer shell layers as the overall material constant $C^*$ of the virtual composite material to be computed. Each of the outer shell layers is composed to envelop, as a coating layer of Urethane U of the constant thickness, each of the inner spherical particles of Filler F existing in the homogeneous virtual composite material whose material constant is $C^*$.

In other words, the proportional constants "$A^U(C^U, C^F, C^*)$" and "$A^F(C^U, C^F, C^*)$" are obtained by solving the known Navier equation under the condition that the body force does not exist but strain $\epsilon^\infty_{ij}$ ("i" and "j" are index numbers of 1-3) is applied at infinity. As illustrated in the following Equation (7), the strain $\epsilon^\infty_{ij}$, applied at infinity, is decomposed into a hydrostatic pressure term (i.e., the first term) and a shear term (i.e., the second term). Accordingly, the proportional constants "$A^U(C^U, C^F, C^*)$" and "$A^F(C^U, C^F, C^*)$" are computed by decomposing them into the hydrostatic pressure term (i.e., the first term) and the shear term (i.e., the second term), respectively.

Equation (7)

$$\varepsilon^\infty_{ij} = \underbrace{\frac{1}{3}\hat{\varepsilon}^\infty}_{1st\ term} \underbrace{\delta_{ij} + \hat{\varepsilon}^\infty_{ij}}_{2nd\ term} \qquad (7)$$

($\delta_{ij}$: Kronecker delta)

The following is an explanation of the method of computing the hydrostatic pressure term (i.e., the first term) and the shear term (i.e., the second term) in the proportional constants "$A^U(C^U, C^F, C^*)$" and "$A^F(C^U, C^F, C^*)$."

(Computations of $A^U(C^U, C^F, C^*)$ and $A^F(C^U, C^F, C^*)$ Based on Hydrostatic Pressure Term)

First, a single spherical particle is assumed to exist in a matrix phase. Basically, the spherical particle is herein formed symmetric about the origin. Under the assumption, displacement $u_i$ ("i" is an index number of 1-3), satisfying the Navier equation regarding the hydrostatic pressure term (i.e., the first term) in Equation (7), is represented using the following Equation (8). The displacement $u_i$ is uniquely defined because of the requirement for matching the ranks of the tensors in the right-hand and left-hand sides of the equation.

Here, it is possible to compute the displacement u, in the inner portion of the spherical particle and displacement u, in the coating layer in the outer portion of the spherical particle by giving a condition that the displacement u, at the origin in the spherical particle has a finite value, a condition that the strain is approaching the first term in Equation (7) at a point of infinity, and a condition of the continuity of the displacement u, and the continuity of the surface traction across the surface of the spherical particle. Specifically, the displacement u, in the inner portion of the spherical particle (i.e., Filler F) is represented using the following Equation (9) whereas the displacement $u_i$ in the coating layer (i.e., Urethane U) in the outside portion of the spherical particle is represented using the following Equation (10). Here, "$u_i^F$" is the displacement inside the spherical particle (i.e., Filler F) whereas "$u_i^U$" is the displacement outside the spherical particle (i.e., Urethane U). Additionally, "a" represents the radius of Filler F whereas "b" represents the radius of Urethane U.

Equation (8)

$$u_i = \left(A + \frac{B}{r^3}\right) x_i \hat{\varepsilon}^\infty \quad (i = 1 \sim 3 : \text{natural number}) \qquad (8)$$

$$\begin{pmatrix} r: \text{distance from center of spherical particle,} \\ x_i: \text{three-dimensional coordinate position} \\ A, B: \text{constant} \end{pmatrix}$$

Equation (9)

$$u_i^F = \frac{9b^3(\lambda^U + 2\mu^U)(\lambda^* + 2\mu^*)}{[4a^3(\mu^u - \mu^*)(3\lambda^F - 3\lambda^U + 2\mu^F - 2\mu^U) + b^3(3\lambda^F + 2\mu^F + 4\mu^U)(3\lambda^U + 2\mu^U + 4\mu^*)]} \hat{\varepsilon}^\infty x_i \qquad (9)$$

Equation (10)

$$u_i^U = \frac{[3b^3(\lambda^* + 2\mu^*)\{a^3(-3\lambda^F + 3\lambda^U - 2\mu^F + 2\mu^U) + r^3(3\lambda^F + 2\mu^F + 4\mu^U)\}]}{[r^3\{4a^3(\mu^u - \mu^*)(3\lambda^F - 3\lambda^U + 2\mu^F - 2\mu^U) + b^3(3\lambda^F + 2\mu^F + 4\mu^U)(3\lambda^U + 2\mu^U + 4\mu^*)\}]} \hat{\varepsilon}^\infty x_i \qquad (10)$$

In short, displacement $u_i$ in each direction in the space is defined as follows where a single spherical particle exists in a matrix phase. Inside the spherical particle (i.e., Filler F), the displacement $u_i$ is proportional to the position $x_i$ (i=1, 2 or 3) defined with the origin located at the center of the spherical particle. Furthermore, in the coating layer outside the spherical particle (i.e., Urethane U), the displacement u is defined to have a term proportional to the position $x_i$ (i=1, 2 or 3) defined with the origin located at the center of the spherical particle, and a term proportional to the position $x_i$ and inversely proportional to the third power of the distance from the center of the spherical particle.

It is herein possible to compute the hydrostatic pressure term of the proportional constant $A^F(C^U, C^F, C^*)$ by computing the strain based on the displacement in the inner portion of the spherical particle represented by Equation (9), whereas it is herein possible to compute the hydrostatic pressure term of the proportional constant $A^U(C^U, C^F, C^*)$ by computing the strain based on the displacement in the coating layer of the spherical particle represented by Equation (10). The following equation (11) exemplifies an expression of the hydrostatic pressure term of the proportional constant $A^F(C^U, C^F, C^*)$ having the bulk modulus $K^*$ and the shear modulus $\mu^*$ as unknowns. Similarly, the following Equation (12) exemplifies an expression of the hydrostatic pressure term of the proportional constant $A^U(C^U, C^F, C^*)$ having the bulk modulus K as unknown. Here, "t" represents the ratio of the radius of Urethane to the radius of Filler (i.e., t=b/a). Additionally, "$K^U$," "$K^F$" and "$K^*$" represent the bulk modulus of Urethane U, the bulk modulus of Filler F and the bulk modulus to be computed, respectively. Furthermore, "$\mu^U$," "$\mu^F$" and "$\mu^*$" represent the Lamé constant of Urethane U, the Lamé constant of Filler F and the Lamé constant to be computed.

and $g(r) \propto r^l$ ("l" is an integer). As a result, the orders l of "r" are calculated as 0, 2, −3 and 5. Accordingly, the displacement $u_i$, satisfying the Navier equation, is represented with an expression for adding terms proportional to the zeroth-power, the second-power, the inverse third-power and the fifth-power of the distance from the center of the spherical particle, respectively, inside the spherical particle and outside the spherical particle. For example, for the order l=2, the equation is represented using the following Equation (14). It should be noted that inside the spherical particle, the material constants of the spherical particle are used for $\lambda$, $\mu$ in Equation (14). Outside the spherical particle, on the other hand, the material constants of the outside region of spherical particle are used for $\lambda$, $\mu$ in Equation (14).

Equation (11)

$$A^F(C^U, C^F, C^*) = \frac{9t^3 \cdot \left(K^U + \frac{4}{3}\mu^U\right) \cdot \left(K^* + \frac{4}{3}\mu^*\right)}{4\left[3\left(K^F - \frac{2}{3}\mu^F\right) + 2\mu^F - 3\left(K^U - \frac{2}{3}\mu^U\right) \cdot (\mu^U - \mu^*) + t^3 \cdot \left\{3 \cdot \left(K^F - \frac{2}{3}\mu^F\right) + 2\mu^F + 4\mu^U\right\} \cdot \left\{3 \cdot \left(K^U - \frac{2}{3}\mu^U\right) + 2\mu^U + 4\mu^*\right\}\right]} \quad (11)$$

Equation (12)

$$A^U(C^U, C^F, C^*) = \frac{3t^3 \cdot \left\{3 \cdot \left(K^F - \frac{2}{3}\mu^F\right) + 2\mu^F + 4\mu^U\right\} \cdot \left(K^* + \frac{4}{3}\mu^*\right)}{4\left[3 \cdot \left\{\left(K^F - \frac{2}{3}\mu^F\right) + 2\mu^F - 3\left(K^U - \frac{2}{3}\mu^U\right) - 2\mu^U\right\} \cdot (\mu^U - \mu^*) + t^3 \cdot \left\{3 \cdot \left(K^F - \frac{2}{3}\mu^F\right) + 2\mu^F + 4\mu^U\right\} \cdot \left\{3 \cdot \left(K^U - \frac{2}{3}\mu^U\right) + 2\mu^U + 4\mu^*\right\}\right]} \quad (12)$$

(Computation of $A(C^B, C^*)$ Based on Shear Term)

It is possible to determine the displacement $u_i$ ("i" is an index number of 1, 2 or 3), satisfying the Navier equation regarding the shear term (i.e., the second term) in Equation (7), with the use of the displacement in the space where a single spherical particle exists in a matrix phase. Specifically, both inside and outside the spherical particle, the displacement in the space where a single spherical particle exists in a matrix phase is defined by an expression for adding terms proportional to the zeroth-power, the second-power, the inverse third-power and the fifth-power of the distance from the center of the spherical particle, respectively. Specifically, as shown in the following equation (13), the displacement $u_i$ is defined to be proportional to the strain term at infinity in the equation. The equation is uniquely defined because of the requirement for matching the ranks of tensors in the Navier equation. In this case, "$x_j$" and "$x_k$" represent the coordinate components in the three-dimensional coordinate. The coordinate components "$x_j$" and "$x_k$" are different from the coordinate element "$x_i$." Furthermore, f(r) and g(r) represent functions of the distance "r" from the center of the spherical particle alone.

Equation (13)

$$u_i = \{f(r) \cdot (x_i x_j / r^2) + g(r) \cdot \delta_{ij}\} \cdot x_k \cdot \hat{\varepsilon}^\infty_{jk} \quad (13)$$
$$(i,j,k = \text{integer of 1-3}) \quad \underbrace{\qquad}_{\text{strain term at a point of infinity}}$$

The order l of "r" is herein computed using the order analysis by assuming that f(r) and g(r), satisfying the Navier equation, have the following relations, respectively: $f(r) \propto r^l$ Equation (14)

$$u_i = \left(r^2 x_i x_j - \frac{7\mu + 5\lambda}{7\mu + 2\lambda} \cdot r^2 \cdot \delta_{ij}\right) \cdot x_k \cdot \hat{\varepsilon}^\infty_{jk} \quad (14)$$

In short, it is possible to represent the displacement u, as an expression consisting of the terms proportional to the zeroth-power, the second-power, the inverse third-power and the fifth-power of the distance from the center of the spherical particle both inside and outside the spherical particle. Similar to the derivation of the hydrostatic pressure term, when the concept of the displacement $u_i$ in the space where a single spherical particle exists in a matrix phase is applied to the inner spherical particle made of Filler F and the outer shell layer enveloping the inner spherical particle with a coating layer made of Urethane U of the predetermined thickness "t," respectively, it is possible to compute the stress field, the strain field and the displacement $u_i$ at a position in the inner spherical particle and a position in the outer shell layer formed concentric around the inner spherical particle. Specifically, it is possible to uniquely compute the displacement $u_i$ with a condition of the continuity of both the displacement and the surface traction on the boundary of each of the inner spherical particles made of Filler F and a condition of the continuity of both the displacement and the surface traction on the boundary of each of the outer shell layers (i.e., the coating layers made of Urethane U). Furthermore, it is possible to obtain the shear terms of the proportional constants $A^U(C^U, C^F, C^*)$ and $A^F(C^U, C^F, C^*)$ by computing the strain based on the displacement $u_i$. The explanation of the obtained shear terms of the proportional constants $A^U(C^U, C^F, C^*)$ and $A^F(C^U, C^F, C^*)$ will be hereinafter omitted because the expressions are quite complex. However, it should be noted that the expressions are at least nonlinear with regard to $C^U$, $C^F$ and $C^*$.

Based on the above, the proportional constants $A^U(C^U, C^F, C^*)$ and $A^F(C^U, C^F, C^*)$ are defined. Then, the proportional constants $A^U(C^U, C^F, C^*)$ and $A^F(C^U, C^F, C^*)$ are substituted into Equation (6) for computing the overall material constant $C^*$. Accordingly, a recursive nonlinear equation is derived. The recursive nonlinear equation is obtained by first defining a virtual composite material, which is composed of inner spherical particles and outer shell layers, each inner spherical particle being made of Filler F and being dispersed in Epoxy P at a known volume fraction, and each outer shell layer enveloping one of the inner spherical particles as a coating layer made of Urethane U of the predetermined thickness (b-a), and next by defining the material constant in each of the surrounding areas of the outer shell layers in the virtual composite material as the overall material constant of the virtual composite material to be computed.

As hereinafter described, a result of the overall material constant of the composite material computed by the computational method of the present invention using the virtual composite material is in good agreement with a result computed by the conventional method using a finite element model which requires a long period of computational time. As a conclusion, the computation result of the present method is highly accurate.

The following is an explanation of the method of computing the overall material constant $C^*$ of the composite material using the recursive nonlinear equation.

Figure 4:
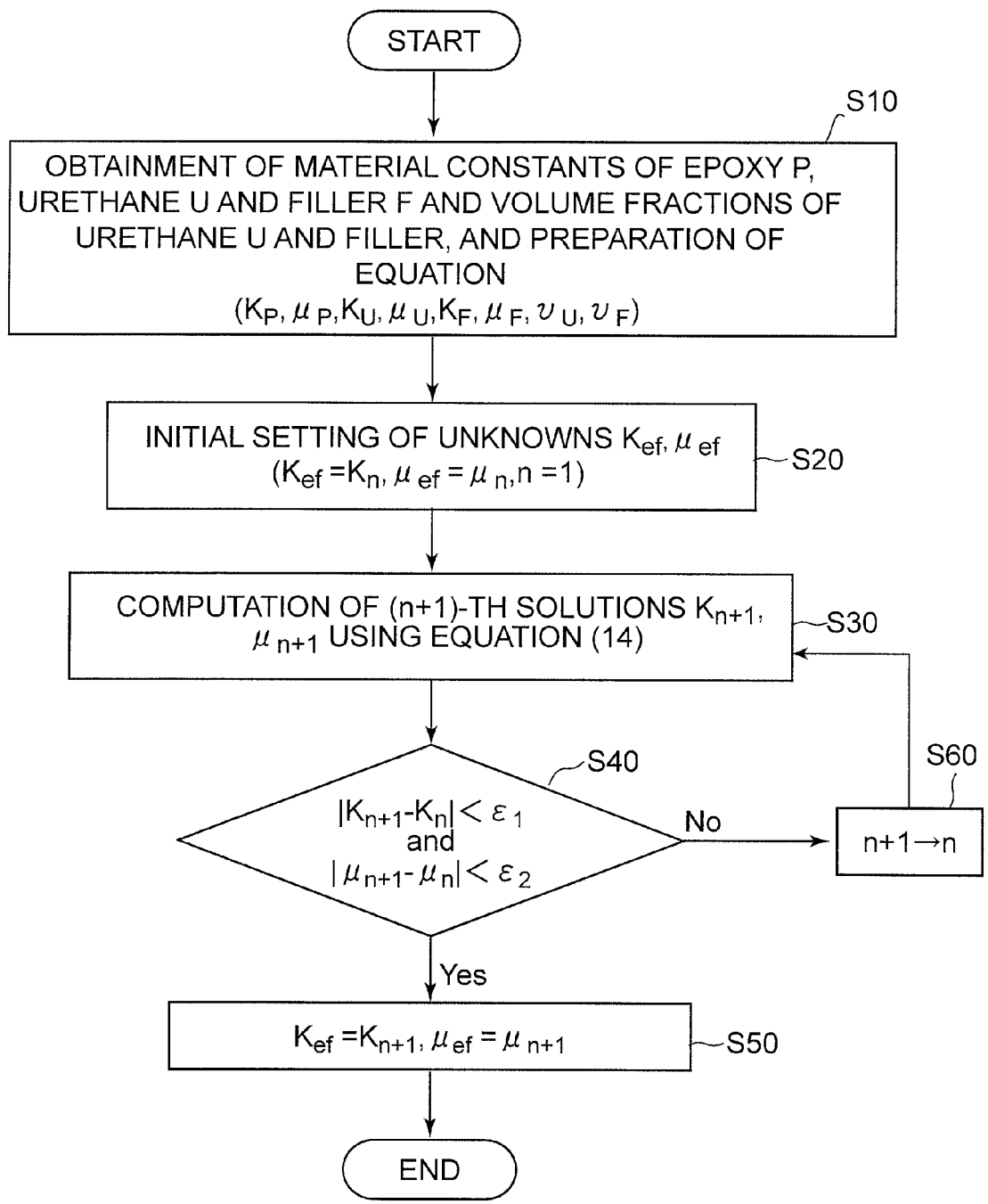
FIG. 4 is a flowchart for illustrating an example of the method of computing the overall material constant of a composite material according to the present invention.

FIG. 4 is a flowchart for illustrating a series of steps for computing the overall material constant $C^*$.

First, the condition setting module 20 sets the first processing for computing the overall material constant $C^*$ of the composite material. The setting is executed by an instruction inputted by an operator through the input device 32. In this case, the material constant $C^*$ is represented in terms of the bulk modulus $K_{ef}$ and the Lamé constants $\mu_{ef}$ (i.e., unknowns to be computed). $K_P$, $K_U$ and $K_F$ hereinafter stand for the bulk moduli of Epoxy P, Urethane U and Filler F. Additionally, $\mu_P$, $\mu_U$ and $\mu_F$ hereinafter stand for the Lamé constants of Epoxy P, Urethane U and Filler F. Furthermore, $v_U$ and $v_F$ hereinafter stand for the volume fractions of Urethane U and Filler F.

First, the module 20 calls up and obtains values of the material constant $C^P$ of Epoxy P, the material constant $C^U$ of Urethane U, the material constant $C^F$ of Filler F, the volume fraction $v_u$ of Urethane U and the volume fraction $v_F$ of Filler F from the database stored in the storage device 30 (Step S10). The values of the material constants and the volume fractions are fed into the nonlinear equation setting module 22, and the values of the coefficients in Equation (6) are therein set. Thus, Equation (6) is modified to be a recursive nonlinear equation having the material constant $C^*$ as the only unknown. In other words, an equation is herein prepared.

Next, the equation-solver module 24 sets the initial values of the bulk modulus $K_{ef}$ and the Lamé constant $\mu_{ef}$ that is, the unknown components of the material constant $C^*$ (Step S20). The initial values are set because Equation (6) is a nonlinear equation and computation is repeated until convergence is reached. Any suitable value may be given as the initial values. However, desirable initial values are set to be, for instance, the weighted means of the material constant $C^P$ of Epoxy P (i.e., the matrix phase), the material constant $C^U$ of Urethane U and the material constant $C^F$ of Filler F using the volume fractions as weighting coefficients. The initial values of the bulk modulus $K_{ef}$ and the Lamé constant $\mu_{ef}$ are set to be $K_1$ and $\mu_1$, respectively (i.e., $K_1=K_1$, $\mu_{ef}=\mu_1$). Furthermore, the initial values are represented as $K_n$, $\mu_n$ (n=1), respectively.

Next, the equation-solver module 24 defines the following Equation (15) derived by modifying Equation (6). Specifically, the left-hand side of Equation (6) is moved to the right-hand side thereof, and the newly produced right-hand side is defined as "$F(C^*)$."

Equation (15):

$$F(C^*) = C^P + v_{F'}(C^F - C^P) \cdot A^F(C^U, C^F, C^*) + v_{U'}(C^U - C^P) \cdot A^U(C^U, C^F, C^*) - C^* \quad (15)$$

Furthermore, the module 24 defines $C^{(n+1)}$ with $F(C^*)$ in accordance with the following Equation (16). In this case, the Newton-Raphson method is applied to Equation (16) for obtaining convergence satisfying "$F(C^*)=0$." Additionally, $C^{(n)}$ is represented in terms of the bulk modulus $K_n$ and the Lamé constant $\mu_n$ whereas $C^{(n+1)}$ is represented in terms of the bulk modulus $K_{n+1}$ and the Lamé constant $\mu_{n+1}$. The module 24 gives the bulk modulus $K_n$ and the Lamé constant $\mu_n$ to $C^{(n)}$ in Equation (16), and accordingly computes and obtains the bulk modulus $K_{n+1}$ and the Lamé constants $\mu_{n+1}$ in accordance with Equation (16) (Step S30). In this case, $F'(C^{(n)})$ in Equation (16) is the Jacobian tensor, and $F'(C^{(n)})^{-1}$ is the inverse tensor of $F'(C^{(n)})$. In other words, the following relation is satisfied: $F'(C^{(n)})^{-1} \cdot F'(C^{(n)}) = I$ ("I" is the identity tensor).

Equation (16):

$$C^{(n+1)} = C^{(n)} - F'(C^{(n)})^{-1} F(C^{(n)}) \quad (16)$$

The computed bulk modulus $K_{n+1}$ and the Lamé constant $\mu_{n+1}$, and the bulk modulus $K_n$ and the Lamé constant $\mu_n$ used for the computation of the bulk modulus $K_{n+1}$ and the Lamé constant $\mu_{n+1}$, are fed into the convergence determination module 26. The module 26 computes the absolute value of the difference between $K_{n+1}$ and $K_n$ (i.e., the absolute value of "$K_{n+1} - K_n$") and the absolute value of the difference between $\mu_{n+1}$ and $\mu_n$ (i.e., the absolute value of "$\mu_{n+1} - \mu_n$"). The module 26 compares the absolute value of "$K_{n+1} - K_n$" with a preset threshold of $\epsilon_1$, and also compares the absolute value of "$\mu_{n+1} - \mu_n$" with a preset threshold of $\epsilon_2$ (Step S40). When the following condition is satisfied as a result of comparison: "the absolute value of "$K_{n+1} - K_n$" is less than the threshold $\epsilon_1$ and the absolute value of "$\mu_{n+1} - \mu_n$" is less than the threshold $\epsilon_2$" (Yes in Step S40), the bulk modulus $K_{ef}$ and the Lamé constant $\mu_{ef}$ (i.e., the overall material constant $C^*$ of the virtual composite material to be computed) are determined to be $K_{n+1}$ and $\mu_{n+1}$, respectively (Step S50).

On the other hand, when the aforementioned condition is not satisfied as a result of comparison (No in Step S40), "n+1" is replaced by "n" (Step S60) and the computation processing returns to Step S30 for computing the bulk modulus $\lambda_{n+1}$ and the Lamé constant $\mu_{n+1}$ with Equation (16). Thus, Steps S30, S40 and S60 are repeated until the condition of Step S40 is satisfied.

The overall material constant $C^*$ of the virtual composite material computed in Step S50 is defined as the overall material constant $C^*$ of the composite material which includes Filler F and Urethane U in Epoxy P.

Next, the Young modulus $E^*$ is computed using the overall material constant $C^*$ of the composite material thus defined, specifically, the bulk modulus $K^*$ and the Lamé constant $\mu^*$. The Young modulus $E^*$ is computed using the following Equation (17). The computed Young modulus $E^*$ is outputted to the output device 34 (e.g., a printer and a display).

Equation (17)

$$E^* = \frac{9K^*\mu^*}{3(K^* + \mu^*)} \quad (17)$$

The computed Young modulus E* is in good agreement with the Young modulus E to be computed using a finite element model as hereinafter described. Therefore, the method of computing the overall material constant of the composite material employing the present invention is obviously beneficial. Furthermore, the method of the present invention is capable of analytically computing the overall material constant of the composite material using Equation (6). Accordingly, the method of the present invention is capable of computing the overall material constant of the composite material in a shorter period of time than the method using a finite element model. In this regard, the method of the present invention is more efficient than the method using a finite element model.

Equation (6), used in the method of computing the overall material constant of the composite material according to the present invention, is an analytic equation. For example, the volume fraction of a predetermined material component may be accordingly set to be an unknown to be computed. In this case, the overall material constant of the composite material is required to be preliminarily acquired by an experiment and like. Computation of the volume fraction of the predetermined material component corresponds to the aforementioned second processing. The following is a specific explanation of the second processing.

Figure 5:
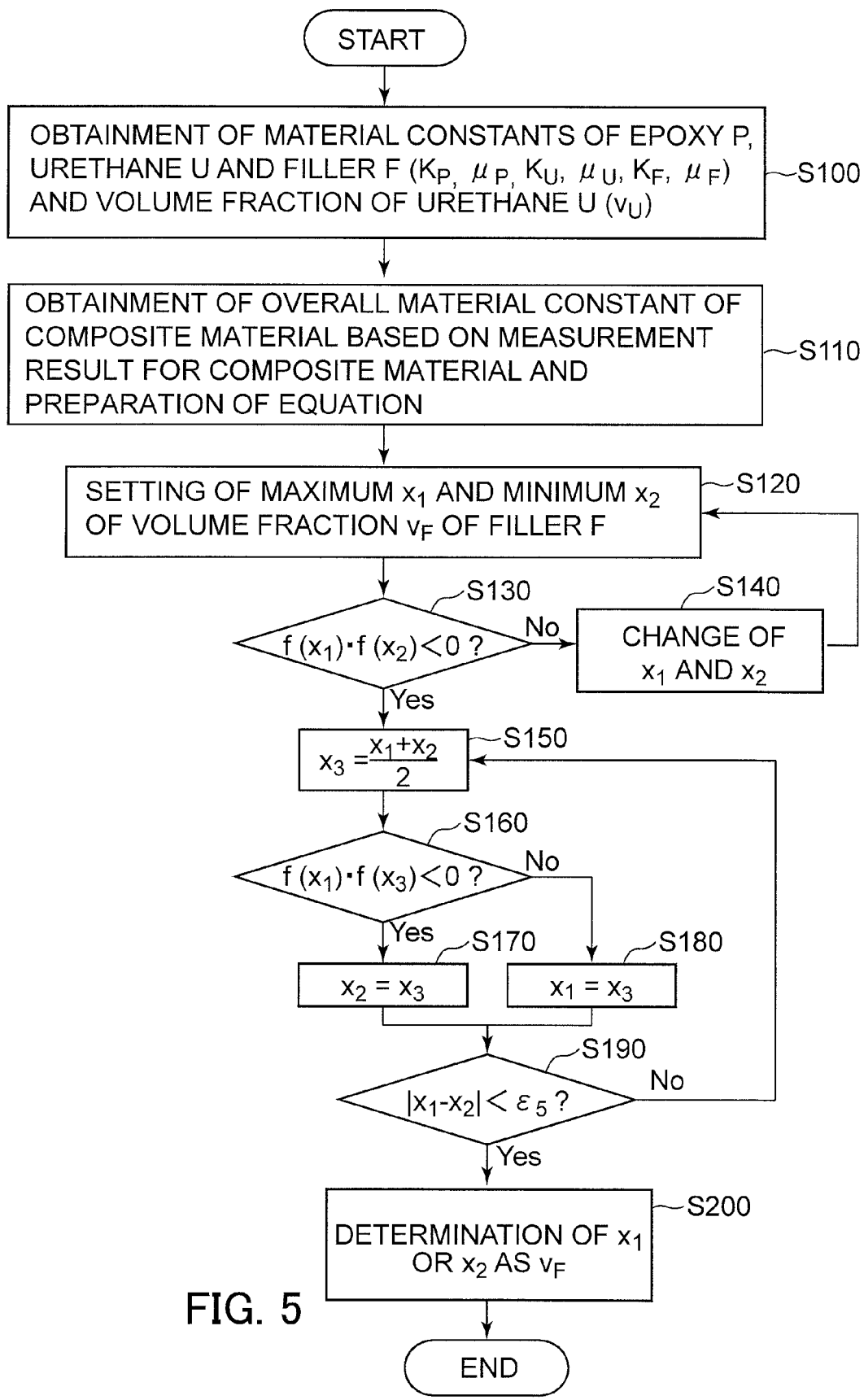
FIG. 5 is a flowchart for illustrating an example of the method of computing the volume fraction of a material component in a composite material according to the present invention.

FIG. 5 is a flowchart for illustrating a series of steps of the second processing. The second processing herein assumes computation of the volume fraction $v_F$ of Filler F in a composite material in which Epoxy P includes Filler F and Urethane U.

First, the condition setting module 20 obtains the material constant of Epoxy P (specifically $K_P$, $\mu_P$), the material constant of Urethane U (specifically $K_U$, $\mu_U$), the material constant of Filler F (specifically $K_F$, $\mu_F$) and the volume fraction $v_U$ of Urethane U (Step S100). Specifically, the module 20 calls up and obtains the material constants and the volume fraction from the database stored in the storage device 30. Alternatively, the module 20 obtains the material constants and the volume fraction to be inputted through the input device 32.

Next, the overall material constants of the composite material (specifically K* and $\mu$*) are obtained and determined from a measurement result of a mechanical experiment of the composite material (Step S110). The measurement result has been preliminarily stored in the storage device 30. The module 20 calls up the measurement result from the storage device 30 and determines the overall material constant of the composite material. The nonlinear equation setting module 22 substitutes values of the obtained material constants and the volume fraction into the coefficients in Equation (6). Accordingly, an equation, having the volume fraction $v_F$ as an unknown, is prepared. In this case, the volume fraction x in the function f(x) is the volume fraction of Filler F, and Equation (6) to be used in the function f(x) is an equation for computing the overall material constant of the virtual composite material in which Filler F is dispersed in Epoxy P and Urethane U envelops Filler F with the predetermined thickness.

Subsequently, the maximum $x_1$ and the minimum $x_2$ of the volume fraction $v_F$ are respectively set (Step S120). The maximum and the minimum of the volume fraction $v_F$ are set for computing the volume fraction $v_F$ using the bisection method as hereinafter described. The maximum and the minimum of the volume fraction $v_F$ may be set by an instruction inputted by an operator through the input device 32. Alternatively, preliminarily-set default values may be set as the maximum and the minimum of the volume fraction $v_F$.

Next, the equation-solver module 24 uses the maximum $x_1$ and the minimum $x_2$ to compute $f(x_1) \cdot f(x_2)$ and the convergence determination module 26 determines if the sign of $f(x_1) \cdot f(x_2)$ is negative (Step S130). When the module 26 determines that the sign of $f(x_1) \cdot f(x_2)$ is positive, the maximum $x_1$ and the minimum $x_2$ are changed (Step S140). A method of changing the maximum and the minimum is not limited to a specific method. However, the maximum $x_1$, which is a volume fraction, is desirably changed to be as large as possible whereas the minimum $x_2$, which is a volume fraction, is desirably changed to be as small as possible.

When the module 26 determines that the sign of $f(x_1) \cdot f(x_2)$ is negative (Yes in Step S130), the following processing will be executed based on the known bisectional method.

Specifically, the module 26 firstly computes "$x_3 = (x_1 + x_2)/2$" (Step S150), and the module 26 determines if the sign of $f(x_1) \cdot f(x_3)$ is negative (Step S160). When the module 26 determines that the sign of $f(x_1) \cdot f(x_3)$ is negative (Yes in Step S160), the minimum "$x_2$" is replaced by "$x_3$" (Step S170). On the other hand, when the module 26 determines that the sign of $f(x_1) \cdot f(x_3)$ is not negative (No in Step S160), the maximum "$x_1$" is replaced by "$x_3$" (Step S180).

Subsequently, the module 26 determines if the absolute value of the difference between the maximum $x_1$ and the minimum $x_2$ is less than a preset threshold of $\epsilon_5$ (Step S190). When the module 26 determines that the absolute value is less than the threshold $\epsilon_5$ (Yes in Step S190), the maximum $x_1$ or the minimum $x_2$ is determined as the volume fraction $v_F$ to be computed (Step S200). When the module 26 determines that the absolute value is not less than the threshold $\epsilon_5$ (No in Step S190), the computation processing returns to Step S150. Thus, Steps S150, S160, S170 and S180 are repeated until the module 26 determines that the absolute value is less than the threshold $\epsilon_5$ in Step S190.

With the aforementioned method, the volume fraction $v_F$ of Filler F is computed. The computed volume fraction $v_F$ of Filler F is outputted to the output device 34.

Note that not only the volume fraction of Filler F but also the volume fraction of Urethane U may be set as an intended volume fraction to be computed. Additionally, volume fractions of multiple kinds of material components may be set as intended volume fractions to be computed.

As described above, the composite material which includes two different kinds of material components in the matrix phase is used for explaining the method of computing the material constant of the composite material according to the present invention and the method of computing the volume fraction according to the present invention. However, three or more kinds of material components may be included in the matrix phase. Furthermore, the matrix phase may not be limited to epoxy. For example, any suitable inorganic material (e.g., metal and ceramic) may be used as the matrix phase. On the other hand, material components in the matrix phase may not be limited to a reinforcement material for reinforcing the matrix phase. For example, any suitable soft material (e.g., urethane) may be used as the material component as described above.

Furthermore, a single or multiple kinds of material components, included in the matrix phase of the composite material, may not be necessarily dispersed in the form of particles.

For example, the material component(s), resolved and mixed with the matrix phase, may be defined as the virtual composite material.

Furthermore, the method of computing the overall material constant of the composite material and the method of computing the volume fraction are also achieved by causing a computer to run a program. In this case, the program is recorded in a computer-readable recording medium. Additionally, the recoding medium includes a type of recording medium which a program, downloaded through the communication network, has been recorded to.

Next, validation of the aforementioned method of computing the overall material constant of the composite material will be hereinafter explained.

In the aforementioned embodiment, the method was explained with the composite material composed of Epoxy P, Filler F and Urethane U. However, a rubber material which is composed of Rubber R, Silica S and bound rubber B was used in the following example.
(1) Rubber of 100 g, including the following:
    SBR (styrene butadiene rubber) of 75 g; and
    BR (butadiene rubber) of 25 g
(2) Silica of 30 g
(3) Others, including the following:
    Coupling agent of 2.4 g
    Aroma oil of 34.12 g
    Zinc of 2.5 g
    Stearic acid of 1.5 g
    Sulfur of 1.47 g
    Vulcanization accelerator of 3.7 g
    Paraffin wax of 1 g
    Other chemicals of 4 g In the above produced rubber material, a bound rubber layer is formed for enveloping a silica particle. Therefore, the rubber material has a structure that silica, in a form of spherical particles, is dispersed in a matrix phase of rubber and the bound rubber layer envelops Silica as a coating layer.

The following are the Young moduli, the Poisson ratios and the volume fractions (%) of the rubber material. In this case, the Young moduli and the Poisson ratios were converted into the Lamé constants and the bulk moduli using a known equation, and the obtained Lamé constants and the bulk moduli are herein used.

|  | Young's Modulus (GPa) | Poisson's Ratio | Volume Fraction (%) |
| --- | --- | --- | --- |
| Rubber | 1 | 0.499 | 82.28 |
| Bound rubber | 10 | 0.4 | 8.86 |
| Silica | 10000 | 0.2 | 8.86 |

The Young modulus was computed to be 1.463 (GPa) as a result of computation of the rubber material in its entirety, using the method of computing the overall material constant of the composite material according to the present invention. On the other hand, the Young modulus was computed to be 1.431 (GPa) as a result of an analysis of the composite material in its entirety, using the finite element model.

Consequently, the Young modulus, computed using the method of the present invention, is in good agreement with the Young modulus computed with the finite element model. Therefore, the method of the present invention is obviously beneficial.

Figure 6:
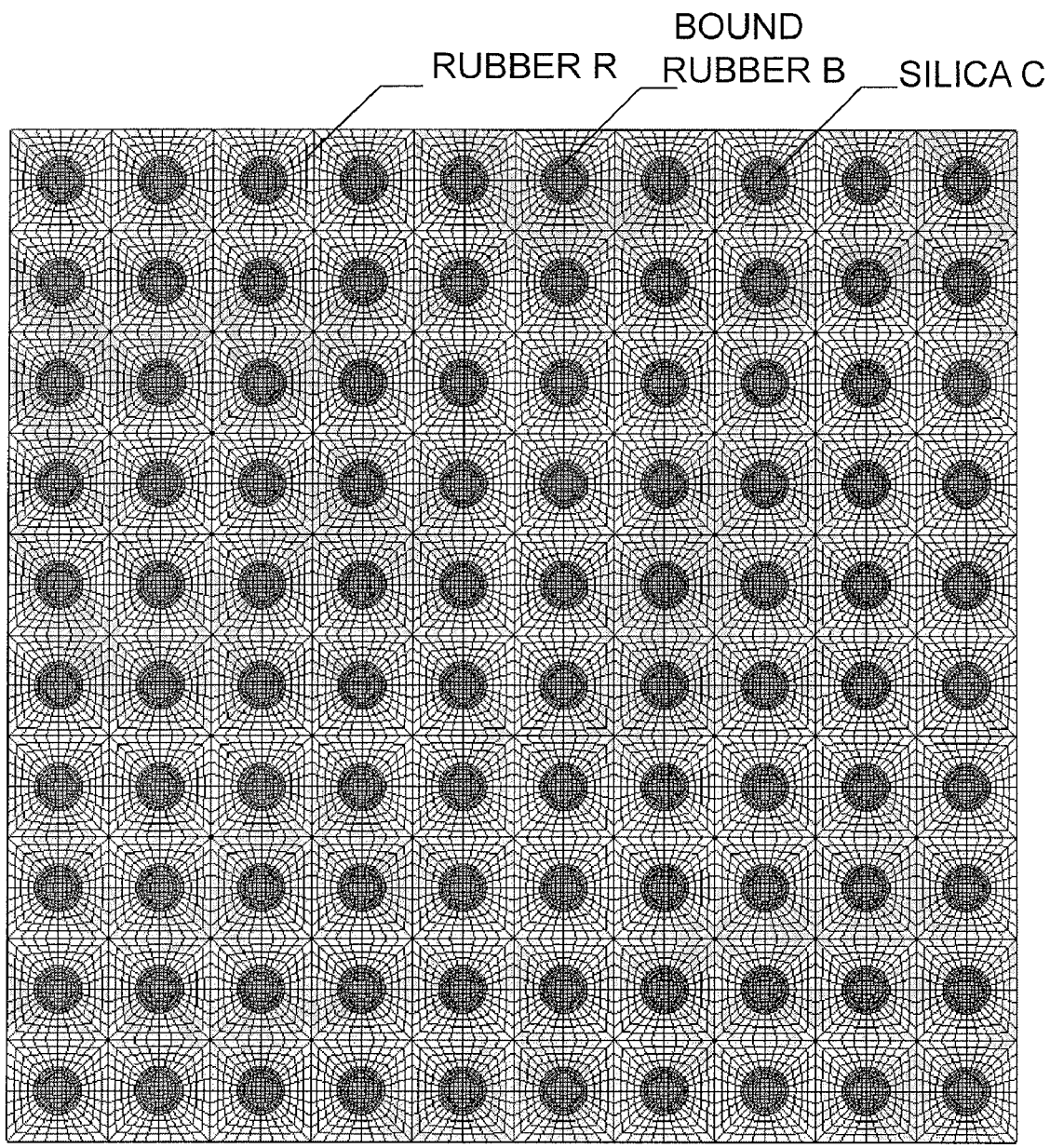
FIG. 6 is a diagram for illustrating a finite element model of the composite material.

Note that computation of the material constant was executed using a finite element model as follows. First, a finite element model was generated by assuming the following composite material. As illustrated in FIG. 6, the composite material was composed of Rubber R (i.e., the matrix phase) and Silica S, Silica being in a form spherical particles. Silica S was included in Rubber R at the volume fraction of 8.86%. Bound rubber B, enveloping Silica S, is included in Rubber R at the volume fraction of 8.86%. Based on this, the overall material constant of the base material was computed. The initial slope of stress-strain curve was computed under the condition that a tensile displacement was applied to the upper end illustrated in FIG. 6 while the lower end illustrated in FIG. 6 is fixed. Based on this, the Young modulus was obtained. Note that the above-generated finite element model was a two-dimensional plane stress element model having 25600 elements and 25761 nodes. Furthermore, commercial software "ABAQUS" which is capable of a nonlinear finite element method, was used for the analysis.

As described above, the embodiment of the present invention specifically explains the method of computing the overall material constant of a composite material, the method of computing the volume fraction of a material component in the composite material, and a recording medium storing a program for causing a computer to execute the methods. However, the present invention is not limited to the aforementioned embodiment. Obviously, a variety of changes and modifications may be possible with respect to the present invention without departing from the scope of the present invention.

What is claimed is:

1. A method of computing an overall mechanical material constant of a composite material, the composite material including a first material component and a second material component in a matrix phase, mechanical material constants of the first material component, the second material component and the matrix phase being known, the method comprising:
    controlling a nonlinear equation setting component of a computer to prepare a nonlinear equation having the overall material constant of a virtual composite material as an unknown by defining, as a composite material, the virtual composite material in which the first material component is dispersed in a form of inner spherical particles in the matrix phase at a known volume fraction and the second material component is in a form of outer shell layers, each of which envelops each of the inner spherical particles as a coating layer of the predetermined thickness; and
    controlling an equation solver component of the computer to compute the overall material constant of the virtual composite material as the overall material constant of the composite material by solving the prepared nonlinear equation, and
    wherein the nonlinear equation is a recursive nonlinear equation which is obtained by defining, as the overall material constant of the virtual composite material to be computed, a material constant in each of surrounding areas of the outer shell layers enveloping the inner spherical particles in the virtual composite material.

2. The method according to claim 1, wherein the nonlinear equation is prepared by determining a displacement in the virtual composite material under a condition that both a surface traction and the displacement are continuous across each of boundaries between the inner spherical particles and the coating layers, and a condition that both a surface traction and the displacement are continuous across each of boundaries between the outer shell layers and the matrix phase.

3. The method according to claim 1, wherein the nonlinear equation is expressed by "$C^* = C^A + v_B \cdot (C^B - C^A) \cdot A^B(C^B, C^C, C^*) + v_C \cdot (C^C - C^A) \cdot A^C(C^B, C^C, C^*)$" when the material constant of the matrix phase, the material constant of the first material component, the material constant of the second material component, the volume fraction of the first material component, a volume fraction of the second material component and the overall material constant of the virtual composite material are represented as $C^A$, $C^B$, $C^C$, $v_B$, $v_C$, and $C^*$, respectively, and wherein each of "$A^B(C^B, C^C, C^*)$" and "$A^C(C^B, C^C, C^*)$" in the equation is obtained by defining a material constant of the outer shell layers enveloping the inner spherical particles in the virtual composite material as the material constant $C^C$ of the second material component and by defining a material constant in each of the surrounding areas of the outer shell layers enveloping the inner spherical particles as the overall material constant of the virtual composite material to be computed, and each of "$A^B(C^B, C^C, C^*)$" and "$A^C(C^B, C^C, C^*)$" is a proportional constant to be defined by a nonlinear expression having the material constant $C^*$ as an unknown.

4. The method according to the claim 1, wherein, when each of stress and strain is decomposed into a shear term and a hydrostatic pressure term, and a displacement of the virtual composite material corresponding to the hydrostatic pressure term is defined as "$u_i$ (i=1,2 or 3),"

the nonlinear equation is prepared by defining:

the displacement $u_i$ inside each of the pairs of the inner spherical particles to be proportional to a position "$x_i$ (i=1,2 or 3)" with an origin at a center of each of the pairs of the inner spherical particles and the outer shell layers; and the displacement $u_i$ in each of the outer shell layers to have:

a term proportional to the position $x_i$ (i=1,2 or 3) with the origin at the center of each of the pairs of the inner spherical particles and the outer shell layers; and a term proportional to the position $x_i$ (i=1,2 or 3) with the origin at the center and inversely proportional to third-power of a distance from the center.

5. The method according to claim 1, wherein, when each of stress and strain is decomposed into a shear term and a hydrostatic pressure term, and a displacement of the virtual composite material corresponding to the sheer term is defined as "$u_i$ (i=1,2 or 3),"

the nonlinear equation is prepared by defining the displacement $u_i$ inside and outside pairs of the inner spherical particles and the outer shell layers with an addition of terms proportional to the zeroth-power, second-power, inverse third-power and fifth-power of a distance from a center of the pairs of the inner spherical particles and the outer shell layers, respectively.

6. The method according to claim 1, wherein the nonlinear equation is solved using the Newton-Raphson method for a solution to reach convergence.

7. A method of computing a volume fraction of a first material component or a second material component in a composite material, the composite material including the first and second material components in a matrix phase, mechanical material constants of the first and the second material components and the matrix phase being known, the method comprising:

controlling a condition setting component of a computer to determine an overall material constant of the composite material based on an experimental result;

controlling a nonlinear equation setting component of the computer to prepare a nonlinear equation having the volume fraction of the first material component or the second material component as an unknown by defining, as the composite material, a virtual composite material in which the first material component is dispersed in a form of inner spherical particles in the matrix phase and the second material component is in a form of outer shell layers, each of which envelops each of the inner spherical particles as a coating layer of the predetermined thickness; and controlling an equation solver component of the computer to compute the volume fraction of the first material component or the second material component by solving the prepared nonlinear equation, and wherein the nonlinear equation is a recursive nonlinear equation which is obtained by defining, as the overall material constant of the composite material, a material constant in each of surrounding areas of the outer shell layers enveloping the inner spherical particles in the virtual composite material.

8. The method according to claim 7, wherein the nonlinear equation is prepared by determining a displacement in the virtual composite material under a condition that a surface traction and the displacement are continuous across each of the boundaries between the inner spherical particles and the coating layers, and a condition that a surface traction and the displacement are continuous across each of boundaries between the outer shell layers and the matrix phase.

9. The method according to claim 7, wherein the nonlinear equation is expressed by "$C^* = C^A + v_B \cdot (C^B - C^A) \cdot A^B(C^B, C^C, C^*) + v_C \cdot (C^C - C^A) \cdot A^C(C^B, C^C, C^*)$" when the material constant of the matrix phase, the material constant of the first material component, the material constant of the second material component, the volume fraction of the first material component, the volume fraction of the second material component and the overall material constant of the virtual composite material are represented as $C^A$, $C^B$, $C^C$, $v_B$, $v_C$, and $C^*$, respectively, and, wherein each of "$A^B(C^B, C^C, C^*)$" and "$A^C(C^B, C^C, C^*)$" in the equation is obtained by defining a material constant of the outer shell layers enveloping the inner spherical particles in the virtual composite material as the material constant $C^C$ of the second material component and by defining the material constant in each of the surrounding areas of the outer shell layers enveloping the inner spherical particles as the overall material constant of the composite material, and each of "$A^B(C^B, C^C, C^*)$" and "$A^C(C^B, C^C, C^*)$" is a proportional constant to be defined by a nonlinear expression having the material constant $C^*$ as an unknown.

10. The method according to claim 7, wherein, when each of stress and strain is decomposed into a shear term and a hydrostatic pressure term, and a displacement of the virtual composite material corresponding to the hydrostatic pressure term is defined as "$u_i$ (i=1,2 or 3),"

the nonlinear equation is prepared by defining:

the displacement $u_i$ inside each of the pairs of the inner spherical particles to be proportional to a position "$x_i$ (i=1,2 or 3)," with an origin at a center of each of the pairs of the inner spherical particles and the outer shell layers; and the displacement $u_i$ in each of the outer shell layers to have:
  a term proportional to the position xi (i=1,2 or 3) with the origin at the center of each of the pairs of the inner spherical particles and the outer shell layers; and
  a term proportional to the position $x_i$ (i=1,2 or 3) with the origin at the center and inversely proportional to the third-power of the distance from the center.

11. The method according to claim 7, wherein,
when each of stress and strain is decomposed into a shear term and a hydrostatic pressure term, and a displacement of the virtual composite material corresponding to the shear term as "$u_i$ (i=1,2 or 3)",
  the nonlinear equation is prepared by determining the displacement $u_i$ inside and outside pairs of the inner spherical particles and the outer shell layers with addition of terms proportional to the zeroth-power, second-power, inverse third-power and fifth-power of a distance from a center of the pairs of the inner spherical particles and the outer shell layers, respectively.

12. The method according to claim 7, wherein the nonlinear equation is solved using the bisection method.

13. A non-transitory computer readable medium storing a computer-executable program for computing an overall mechanical material constant of a composite material, the composite material including a first material component and a second material component in a matrix phase, mechanical material constants of the first and second material components and the matrix phase being known,
  wherein the program causes a computer to execute a method comprising:
    controlling a nonlinear equation setting component of the computer to prepare a nonlinear equation having the overall material constant of a virtual composite material as an unknown by defining, as a composite material, the virtual composite material in which the first material component is dispersed in a form of inner spherical particles in the matrix phase at a known volume fraction and the second material component is in a form of outer shell layers, each of which envelops each of the inner spherical particles as a coating layer of the predetermined thickness; and
    controlling a equation solver component of the computer to compute the overall material constant of the virtual composite material as the overall material constant of the composite material by solving the prepared nonlinear equation, and
  wherein the nonlinear equation is a recursive nonlinear equation which is obtained by defining, as the overall material constant of the virtual composite material to be computed, a material constant in each of surrounding areas of the outer shell layers enveloping the inner spherical particles in the virtual composite material.

14. The non-transitory computer readable medium according to claim 13, wherein the nonlinear equation is prepared by defining a displacement in the virtual composite material under a condition that the displacement and a surface traction are continuous across each of boundaries between the inner spherical particles and the outer shell layers and a condition that the displacement and a surface traction are continuous across each of boundaries between the outer shell layers and the matrix phase.

15. The non-transitory computer readable medium according to claim 13,
  wherein the nonlinear equation is expressed by "$C^* = C^A + v_B \cdot (C^B - C^A) \cdot A^B(C^B, C^C, C^*) + v_C \cdot (C^C - C^A) \cdot A^C(C^B, C^C, C^*)$" when the material constant of the matrix phase, the material constant of the first material component, the material constant of the second material component, the volume fraction of the first material component, a volume fraction of the second material component and the overall material constant of the virtual composite material are represented as $C^A$, $C^B$, $C^C$, $v_B$, $v_C$, and $C^*$, respectively, and
  wherein each of "$A^B(C^B, C^C, C^*)$" and "$A^C(C^B, C^C, C^*)$" in the equation is obtained by defining a material constant of the outer shell layers enveloping the inner spherical particles in the virtual composite material as the material constant $C^C$ of the second material component and by defining, as the overall material constant of the virtual composite material to be computed, the material constant in each of surrounding areas of the outer shell layers enveloping the inner spherical particles, and each of "$A^B(C^B, C^C, C^*)$" and "$A^C(C^B, C^C, C^*)$" is a proportional constant determined by a nonlinear expression having the material constant $C^*$ as an unknown.

16. A non-transitory computer readable medium storing a computer-executable program for computing a volume fraction of a first material component or a volume fraction of a second material component in a composite material, the composite material including the first and second composite material in a matrix phase, mechanical material constants of the first and second material components and the matrix phase being known,
  wherein the program causes a computer to execute a method comprising:
    controlling a condition setting component of a computer to determine an overall material constant of the composite material based on an experimental result;
    controlling a nonlinear equation setting component of the computer to prepare a nonlinear equation having the volume fraction of the first material component or the volume fraction of the second material component as an unknown by defining, as the composite material, a virtual composite material in which the first material component is dispersed in a form of inner spherical particles in the matrix phase and the second material component is in a form of outer shell layers, each of which envelops each of the inner spherical particles as a coating layer of the predetermined thickness; and
    controlling an equation solver component of the computer to compute the volume fraction of the first material component or the second material component by solving the prepared nonlinear equation, and
  wherein the nonlinear equation is a recursive nonlinear equation obtained by defining, as the overall material constant of the composite material, a material constant in each of the surrounding areas of the outer shell layers enveloping the inner spherical particles in the virtual composite material.

17. The non-transitory computer readable medium according to claim 16, wherein the nonlinear equation is prepared by defining a displacement in the virtual composite material under a condition that the displacement and a surface traction are continuous across each of boundaries between the inner spherical particles and the coating layers and a condition that the displacement and a surface traction are continuous across each of boundaries between the outer shell layers and the matrix phase.

18. The non-transitory computer readable medium according to claim 16,
  wherein the nonlinear equation is expressed by "$C^* = C^A + v_B \cdot (C^B - C^A) \cdot A^B(C^B, C^C, C^*) + v_C \cdot (C^C - C^A) \cdot A^C(C^B, C^C,$ C*)" when the material constant of the matrix phase, the material constant of the first material component, the material constant of the second material component, the volume fraction of the first material component, the volume fraction of the second material component and the overall material constant of the virtual composite material are represented as $C^A$, $C^B$, $C^C$, $v_B$, $v_C$, and C*, respectively, and, wherein each of "$A^B(C^B, C^C, C^*)$" and "$A^C(C^B, C^C, C^*)$" in the equation is obtained by defining a material constant of the outer shell layers enveloping the inner spherical particles in the virtual composite material as the material constant $C^C$ of the second material component, and by defining the material constant in each of surrounding areas of the outer shell layers enveloping the inner spherical particles as the overall material constant of the composite material, and each of "$A^B(C^B, C^C, C^*)$" and "$A^C(C^B, C^C, C^*)$" is a proportional constant determined by a nonlinear expression having the material constant C* as an unknown.

* * * * *

UNITED STATES PATENT AND TRADEMARK OFFICE
CERTIFICATE OF CORRECTION

PATENT NO. : 8,170,846 B2
APPLICATION NO. : 12/423196
DATED : May 1, 2012
INVENTOR(S) : Nobuo Suzuki et al.

It is certified that error appears in the above-identified patent and that said Letters Patent is hereby corrected as shown below:

On the cover page, Item [54] and column 1, change the Title of the invention from COMPUTATION METHOD OF MECHANICAL MATERIAL CONSTANT OF COMPOSITE MATERIAL AND VOLUME FRACTION OF MATERIAL COMPONENT IN COMPOSITE MATERIAL, AND RECORDING MEDIUM to -- COMPUTATIONAL METHOD OF MATERIAL CONSTANT OF COMPOSITE MATERIAL AND VOLUME FRACTION OF MATERIAL COMPONENT IN COMPOSITE MATERIAL, AND RECORDING MEDIUM --

Signed and Sealed this
Twelfth Day of June, 2012

David J. Kappos
*Director of the United States Patent and Trademark Office*